(12) United States Patent
Moreillon et al.

(10) Patent No.: US 10,988,169 B2
(45) Date of Patent: Apr. 27, 2021

(54) STEERING DEVICE

(71) Applicant: JTEKT CORPORATION, Osaka (JP)

(72) Inventors: Maxime Moreillon, Nara (JP);
Tsutomu Tamura, Nara (JP); Robert Fuchs, Nara (JP)

(73) Assignee: JTEKT CORPORATION, Osaka (JP)

( * ) Notice: Subject to any disclaimer, the term of this patent is extended or adjusted under 35 U.S.C. 154(b) by 30 days.

(21) Appl. No.: 16/587,140

(22) Filed: Sep. 30, 2019

(65) Prior Publication Data

US 2020/0108858 A1    Apr. 9, 2020

(30) Foreign Application Priority Data

Oct. 9, 2018   (JP) .............................. JP2018-190999

(51) Int. Cl.
*B62D 5/00*    (2006.01)
*B62D 5/04*    (2006.01)
(Continued)

(52) U.S. Cl.
CPC ........... *B62D 5/0463* (2013.01); *B62D 5/046* (2013.01); *B62D 5/0457* (2013.01); *B62D 6/002* (2013.01); *B62D 6/08* (2013.01); *B62D 15/021* (2013.01); *B60W 2510/20* (2013.01); *B60W 2510/202* (2013.01); *B60W 2510/205* (2013.01); *B60W 2540/18* (2013.01); *B60W 2710/20* (2013.01);
(Continued)

(58) Field of Classification Search
CPC .... B62D 5/0463; B62D 5/046; B62D 5/0457; B62D 6/002; B62D 6/08; B62D 15/021; B62D 6/10; B62D 5/04; B62D 6/00; B60W 2510/20; B60W 2510/202; B60W 2710/20; B60W 2540/18; B60W 2510/205; B60W 2710/202; B60W 2710/205; G01L 5/221
See application file for complete search history.

(56) References Cited

U.S. PATENT DOCUMENTS 10,843,727 B2 * 11/2020 Moreillon ................ B62D 6/08
2006/0086560 A1    4/2006 Furusho et al.
(Continued)

FOREIGN PATENT DOCUMENTS

EP         1081018 A2    3/2001
EP         2052947 A1    4/2009
(Continued)

OTHER PUBLICATIONS

Mar. 24, 2020 Extended European Search Report issued in European Patent Application No. 19201422.3.

*Primary Examiner* — Jason Holloway
(74) *Attorney, Agent, or Firm* — Oliff PLC

(57) ABSTRACT

A steering device includes a steering wheel, a torsion bar, a spiral cable, a torque sensor, and an electronic control unit. The electronic control unit is configured to compute a rotational angle of the steering wheel. The electronic control unit is configured to compute, as driver torque, a value that includes a sum obtained by adding torsion bar torque, a steering wheel inertial torque compensation value and a spiral cable torque compensation value. The steering wheel inertial torque compensation value is the product of a steering wheel inertial moment and a second-order differential value of the rotational angle of the steering wheel. The spiral cable torque is torque that acts on the steering wheel because of the spiral cable.

9 Claims, 8 Drawing Sheets

(51) Int. Cl.
   *B62D 6/00*   (2006.01)
   *B62D 6/08*   (2006.01)
   *B62D 15/02*   (2006.01)
(52) U.S. Cl.
   CPC . *B60W 2710/202* (2013.01); *B60W 2710/205* (2013.01)

(56) References Cited

U.S. PATENT DOCUMENTS

2008/0243341 A1* 10/2008 Hayama ................. B62D 5/001
                                                                      701/42
2015/0021890 A1*  1/2015 Morita .................... B62D 1/189
                                                                      280/777
2017/0021859 A1*  1/2017 Kodera ................. B62D 5/001
2017/0369095 A1* 12/2017 Kodera ................ B62D 5/0421

FOREIGN PATENT DOCUMENTS

EP            3424799 A1    1/2019
JP         2006-151360 A    6/2006

* cited by examiner

STEERING DEVICE

INCORPORATION BY REFERENCE

The disclosure of Japanese Patent Application No. 2018-190999 filed on Oct. 9, 2018 including the specification, drawings and abstract is incorporated herein by reference in its entirety.

BACKGROUND

1. Technical Field

The present disclosure relates to a steering device that can estimate driver torque applied to a steering wheel by a driver.

2. Description of Related Art

Japanese Unexamined Patent Application Publication No. 2006-151360 discloses a steering system that includes a steering torque sensor that detects torsion of a torsion bar, a steering angle sensor that detects the rotational angle (steering angle) of a column shaft, and a torque generation unit that computes steering wheel-end torque (driver torque) based on a steering torque detection value obtained by the steering torque sensor and a steering angle detection value obtained by the steering angle sensor.

SUMMARY

The present disclosure allows high-precision estimation of driver torque.

An aspect of the present disclosure provides a steering device. The steering device includes: a steering wheel configured to steer a vehicle; a torsion bar provided at an intermediate portion of a rotary shaft that rotates together with the steering wheel; a spiral cable, a first end of which is connected to a first member that rotates together with the rotary shaft and a second end of which is connected to a second member that is stationary with respect to a vehicle body; a torque sensor configured to detect torsion bar torque applied to the torsion bar; and an electronic control unit configured to estimate driver torque applied to the steering wheel by a driver. The electronic control unit is configured to compute a rotational angle of the steering wheel. The electronic control unit is configured to compute, as the driver torque, a value that includes a sum obtained by adding the torsion bar torque, a steering wheel inertial torque compensation value, and a compensation value for spiral cable torque. The steering wheel inertial torque compensation value is a product of a steering wheel inertial moment and a second-order differential value of the rotational angle of the steering wheel. The spiral cable torque is torque that acts on the steering wheel because of the spiral cable.

With the configuration described above, the driver torque is computed in consideration of not only the torsion bar torque and the steering wheel inertial torque but also the spiral cable torque which acts on the steering wheel because of the spiral cable. Therefore, the driver torque can be estimated precisely.

The steering device may further include: a steering mechanism that steers steered wheels in conjunction with rotation of the steering wheel; and an electric motor that applies a steering assist force to the steering mechanism. The electronic control unit may be configured to compute a rotational angle of a downstream portion of the rotary shaft, the downstream portion being a portion of the rotary shaft located downstream of the torsion bar, based on a rotational angle of the electric motor. The electronic control unit may be configured to compute the rotational angle of the steering wheel using the rotational angle of the downstream portion of the rotary shaft and the torsion bar torque. The steering device may further include: a rotational angle sensor configured to detect the rotational angle of the steering wheel. The electronic control unit may be configured to compute the rotational angle of the steering wheel based on the rotational angle detected by the rotational angle sensor. In the steering device, the electronic control unit may be configured to compute the driver torque by adding a compensation value for rotating unbalance torque to the sum. The rotating unbalance torque may be torque applied to the rotary shaft by a gravitational force that acts on a center of gravity of the steering wheel.

With the configuration described above, the driver torque is computed in consideration of the rotating unbalance torque, which is applied to the rotary shaft by the gravitational force which acts on the center of gravity of the steering wheel as well. Therefore, the driver torque can be estimated more precisely.

In the steering device, the electronic control unit may be configured to compute the driver torque by adding a compensation value for viscous friction torque to the sum. The viscous friction torque may act on an upstream portion of the rotary shaft and the steering wheel. The upstream portion may be a portion of the rotary shaft located upstream of the torsion bar. The compensation value for the viscous friction torque may be a product of a first-order differential value of the rotational angle of the steering wheel and a predetermined viscous friction torque coefficient.

With the configuration described above, the driver torque is computed in consideration of the viscous friction torque, which acts on the portion of the rotary shaft upstream of the torsion bar and the steering wheel as well. Therefore, the driver torque can be estimated more precisely.

In the steering device, the electronic control unit may be configured to compute the driver torque by adding a compensation value for coulomb friction torque to the sum. The coulomb friction torque may act on an upstream portion of the rotary shaft and the steering wheel. The upstream portion may be a portion of the rotary shaft located upstream of the torsion bar. The compensation value for the coulomb friction torque may be a product of a predetermined coulomb friction torque coefficient and a hyperbolic tangent value of a product of a predetermined coulomb friction torque variation gradient and a first-order differential value of the rotational angle of the steering wheel.

With the configuration described above, the driver torque is computed in consideration of the Coulomb friction torque, which acts on the portion of the rotary shaft upstream of the torsion bar and the steering wheel as well. Therefore, the driver torque can be estimated more precisely.

In the steering device, the compensation value for the spiral cable torque may be obtained from a product of a spring constant of the spiral cable and the rotational angle of the steering wheel or from map data that represent the compensation value for the spiral cable torque relative to the rotational angle of the steering wheel.

In the steering device, the compensation value for the rotating unbalance torque may be a product of a distance between a position of the center of gravity of the steering wheel and a position of a center of rotation of the steering wheel, a mass of the steering wheel, a sine value of the rotational angle of the steering wheel, and a cosine value of a steering wheel tilt angle. The steering wheel tilt angle may be an angle between a vertical line that passes through the position of the center of rotation of the steering wheel and a plane of rotation of the steering wheel with the steering wheel mounted on the vehicle. The rotational angle of the steering wheel may be an angle that matches an amount of rotation and a direction of rotation from a neutral position of the steering wheel at which the vehicle travels straight forward.

In the steering device, the electronic control unit may be configured to determine, based on the estimated driver torque, whether a hands-on state is established or a hands-off state is established.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
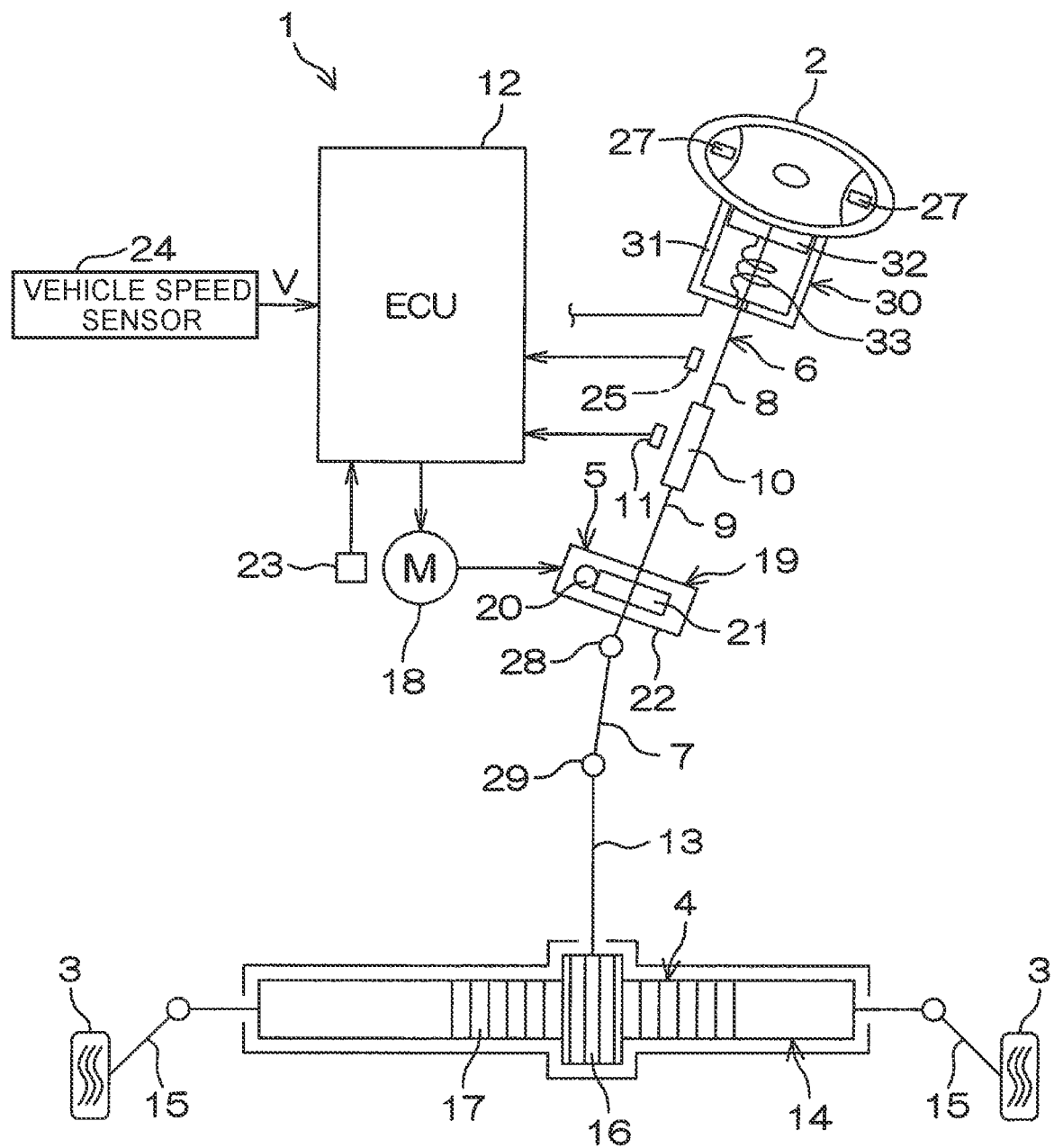
FIG. 1 is a schematic diagram illustrating a schematic configuration of an electric power steering system to which a steering device according to an embodiment of the present disclosure is applied.

FIG. 1 is a schematic diagram illustrating a schematic configuration of an electric power steering system to which a steering device according to an embodiment of the present disclosure is applied. An electric power steering system (vehicle steering device) 1 is an electric power steering system of a column assist type (hereinafter referred to as a "column-type EPS") in which an electric motor and a speed reducer are disposed in a column portion.

The column-type EPS 1 includes a steering wheel 2 that serves as a steering member used to steer a vehicle, a steering mechanism 4 that steers steered wheels 3 in conjunction with rotation of the steering wheel 2, and a steering assist mechanism 5 that assists a driver in steering. The steering wheel 2 and the steering mechanism 4 are mechanically coupled to each other via a steering shaft 6, a first universal joint 28, an intermediate shaft 7, and a second universal joint 29.

Electronic components 27 that include various types of switches are mounted on the steering wheel 2. The steering shaft 6 includes a first shaft 8 coupled to the steering wheel 2, and a second shaft 9 coupled to the intermediate shaft 7 via the first universal joint 28. The first shaft 8 and the second shaft 9 are coupled so as to be rotatable relative to each other via a torsion bar 10. The first shaft 8 is an example of a portion, upstream of the torsion bar 10, of a rotary shaft that rotates together with the steering wheel 2. The second shaft 9 is an example of a portion, downstream of the torsion bar 10, of the rotary shaft which rotates together with the steering wheel 2.

A spiral cable device 30 is coupled to the first shaft 8. The spiral cable device 30 includes a stator 31, a rotator 32, and a spiral cable 33. The stator 31 is fixed to the vehicle body side. The stator 31 has a first connector (not illustrated). The rotator 32 is attached so as to be rotatable relative to the stator 31. The rotator 32 is fixed to the steering wheel 2 or the first shaft 8 so as to be rotatable together with the first shaft 8 (in an accompanying manner). The rotator 32 has a second connector (not illustrated).

The spiral cable 33 is housed in a space defined by the stator 31 and the rotator 32. One end of the spiral cable 33 is connected to the second connector of the rotator 32. The second connector is electrically connected to the electronic components 27 which are mounted on the steering wheel 2 via a connection cable (not illustrated). The other end of the spiral cable 33 is connected to the first connector of the stator 31. The first connector is electrically connected to a device on the vehicle body side (e.g. a device corresponding to the various types of switches) via a connection cable (not illustrated).

A torque sensor 11 is provided around the steering shaft 6. The torque sensor 11 detects torsion bar torque $T_{tb}$ applied to the torsion bar 10 based on the amount of relative rotational displacement between the first shaft 8 and the second shaft 9. The torsion bar torque $T_{tb}$ detected by the torque sensor 11 is input to an electronic control unit (ECU) 12.

The steering mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7 via the second universal joint 29. A pinion 16 is coupled to the distal end of the pinion shaft 13.

The rack shaft 14 extends linearly along the right-left direction of the vehicle. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by the movement of the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 that generates a steering assist force, and a speed reducer 19 that amplifies and transfers output torque of the electric motor 18 to the steering mechanism 4. In the embodiment, the electric motor 18 is a three-phase brushless motor. The speed reducer 19 is composed of a worm gear mechanism that includes a worm gear 20 and a worm wheel 21 meshed with the worm gear 20. The speed reducer 19 is housed in a gear housing 22. In the following description, the speed reduction ratio (gear ratio) of the speed reducer 19 is occasionally represented by $r_{wg}$. The speed reduction ratio $r_{wg}$ is defined as a ratio $\omega_{wg}/\omega_{ww}$ of an angular speed $\omega_{wg}$ of the worm gear 20 to an angular speed $\omega_{ww}$ of the worm wheel 21.

The worm gear 20 is rotationally driven by the electric motor 18. The worm wheel 21 is coupled so as to be rotatable together with the second shaft 9. The worm wheel 21 is rotationally driven by the worm gear 20. The electric motor 18 is driven in accordance with the state of steering by the driver. The worm gear 20 is rotationally driven by the electric motor 18. Consequently, the worm wheel 21 is rotationally driven, which rotates the steering shaft 6 (second shaft 9) while applying motor torque to the steering shaft 6. Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm gear 20 is rotationally driven by the electric motor 18 to enable steering assist by the electric motor 18.

Figure 2:
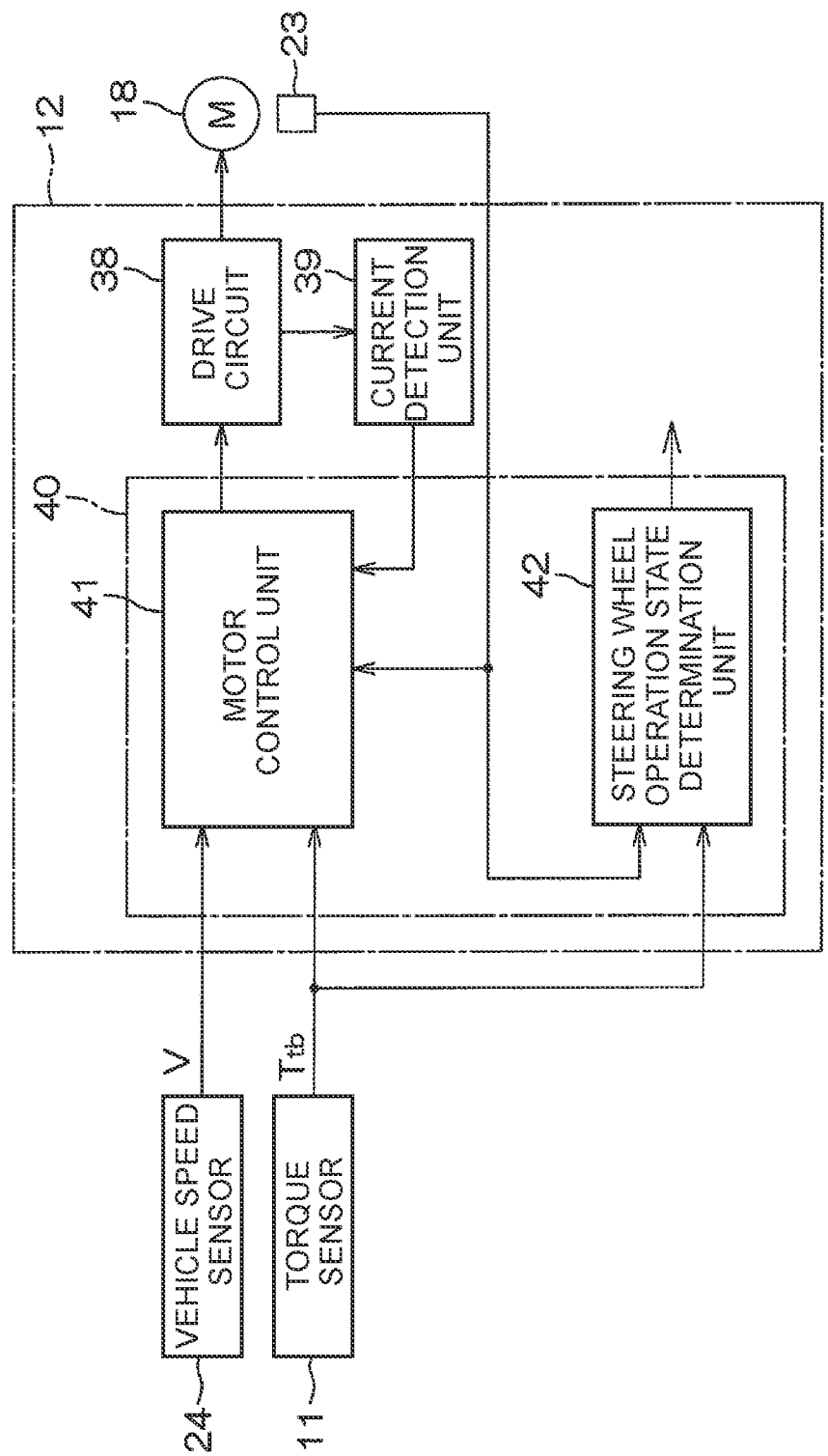
FIG. 2 is a block diagram illustrating the electric configuration of an electronic control unit (ECU)

The rotational angle (hereinafter referred to as the "rotor rotational angle") of a rotor of the electric motor 18 is detected by a rotational angle sensor 23 such as a resolver. A vehicle speed V is detected by a vehicle speed sensor 24. An output signal from the rotational angle sensor 23 and the vehicle speed V detected by the vehicle speed sensor 24 are input to the ECU 12. The electric motor 18 is controlled by the ECU 12. FIG. 2 is a schematic diagram illustrating the electric configuration of the ECU 12.

The ECU 12 includes a microcomputer 40, a drive circuit (three-phase inverter circuit) 38 controlled by the microcomputer 40 so as to supply electric power to the electric motor 18, and a current detection unit 39 that detects a current (hereinafter referred to as a "motor current") that flows through the electric motor 18. The microcomputer 40 includes a central processing unit (CPU) and a memory (such as a read-only memory (ROM), a random-access memory (RAM), and a non-volatile memory), and executes a predetermined program to function as a plurality of function processing units. The plurality of function processing units include a motor control unit 41 and a steering wheel operation state determination unit 42.

The motor control unit 41 controls drive of the drive circuit 38 based on the vehicle speed V detected by the vehicle speed sensor 24, the torsion bar torque $T_{tb}$ detected by the torque sensor 11, the rotor rotational angle computed based on the output from the rotational angle sensor 23, and the motor current detected by the current detection unit 39, for example. Specifically, the motor control unit 41 sets a current command value, which is a target value for the motor current which flows through the electric motor 18, based on the torsion bar torque $T_{tb}$ and the vehicle speed V. The current command value corresponds to a target value for a steering assist force (assist torque) that matches the steering condition. The motor control unit 41 controls drive of the drive circuit 38 such that the motor current detected by the current detection unit 39 approximates the current command value. Consequently, appropriate steering assist that matches the steering condition is achieved.

Figure 3:
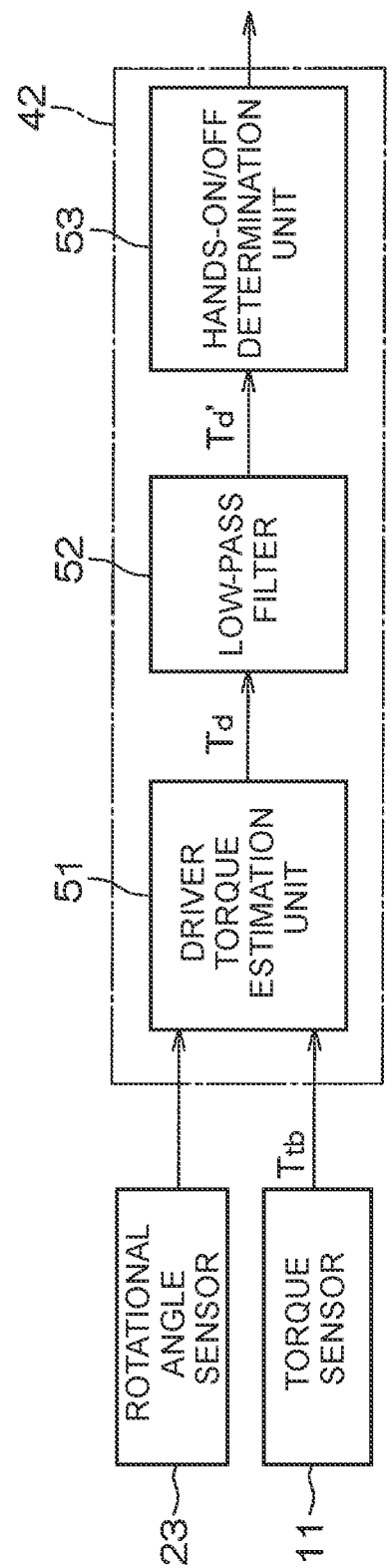
FIG. 3 is a block diagram illustrating the electric configuration of a steering wheel operation state determination unit.

The steering wheel operation state determination unit 42 determines, based on the torsion bar torque $T_{tb}$ detected by the torque sensor 11 and the rotor rotational angle computed based on the output from the rotational angle sensor 23, whether a hands-on state in which the driver is grasping the steering wheel is established or a hands-off state (hands-free state) in which the driver is not grasping the steering wheel is established. FIG. 3 is a block diagram illustrating the electric configuration of the steering wheel operation state determination unit 42.

The steering wheel operation state determination unit 42 includes a driver torque estimation unit 51, a low-pass filter 52, and a hands-on/off determination unit 53. The driver torque estimation unit 51 estimates driver torque $T_d$ based on the output signal from the rotational angle sensor 23 and the torsion bar torque $T_{tb}$ detected by the torque sensor 11. The low-pass filter 52 performs a low-pass filter process on the driver torque $T_d$ estimated by the driver torque estimation unit 51. The hands-on/off determination unit 53 determines whether a hands-on state is established or a hands-off state is established based on driver torque $T_d'$ after being subjected to the low-pass filter process by the low-pass filter 52. Such processes will be described below.

In the embodiment, the driver torque estimation unit 51 computes the driver torque $T_d$ based on the following formula (1).

$$T_d = J_{sw} \cdot d_2\theta_{sw}/dt_2 + T_{tb} + T_c + T_{ru} + T_{fr} + T_{sc} \quad (1)$$

$J_{sw}$: steering wheel inertial moment $\theta_{sw}$: steering wheel angle estimated value (steering wheel rotational angle)

$d_2\theta_{sw}/dt_2$: steering wheel angular acceleration estimated value (a second-order differential value of the steering wheel angle estimated value)

$J_{sw} \cdot d_2\theta_{sw}/dt_2$: steering wheel inertial torque compensation value {=−(steering wheel inertial torque estimated value)}

$T_{tb}$: torsion bar torque (torsion bar torque detected by the torque sensor 11 in the embodiment)

$T_c$: viscous friction torque compensation value {=−(viscous friction torque estimated value)}

$T_{ru}$: rotating unbalance torque compensation value {=−(rotating unbalance torque estimated value)}

$T_{fr}$: Coulomb friction torque compensation value {=−(Coulomb friction torque estimated value)}

$T_{sc}$: spiral cable torque compensation value {=−(spiral cable torque estimated value)}

In the embodiment, the signs of the torsion bar torque $T_{tb}$ and the driver torque $T_d$ are positive in the case of torque in the direction of steering to the left, and negative in the case of torque in the direction of steering to the right. The steering wheel angle estimated value $\theta_{sw}$ represents the amount of forward/reverse rotation from a neutral position of the steering wheel. In the embodiment, the amount of rotation toward the left from the neutral position has a positive value, and the amount of rotation toward the right from the neutral position has a negative value.

The steering wheel inertial torque estimated value $(-J_{sw} \cdot d_2\theta_{sw}/dt_2)$, the viscous friction torque estimated value $(-T_c)$, the Coulomb friction torque estimated value $(-T_{fr})$, and the spiral cable torque estimated value $(-T_{sc})$ act in the direction opposite to the direction of the driver torque $T_d$. Therefore, the signs of such estimated values $(-J_{sw} \cdot d_2\theta_{sw}/dt_2)$, $(-T_c)$, $(-T_{fr})$, and $(-T_{sc})$ are opposite to the sign of the driver torque $T_d$.

Thus, the signs of the steering wheel inertial torque compensation value $J_{sw} \cdot d_2\theta_{sw}/dt_2$, the viscous friction torque compensation value $T_c$, the Coulomb friction torque compensation value $T_{fr}$, and the spiral cable torque compensation value $T_{sc}$ are the same as the sign of the driver torque $T_d$. The sign of the rotating unbalance torque estimated value $(-T_{ru})$ may be the same as or opposite to the sign of the driver torque $T_d$, depending on the steering wheel angle estimated value $\theta_{sw}$. Thus, the sign of the rotating unbalance torque compensation value $T_{ru}$ may be the same as or opposite to the sign of the driver torque $T_d$, depending on the steering wheel angle estimated value $\theta_{sw}$. In the embodiment, the steering wheel angle estimated value $\theta_{sw}$ is represented by the following formula (2).

$$\theta_{sw}=(T_{tb}/k_{tb})+\theta_{ww} \qquad (2)$$

$k_{tb}$: rigidity of the torsion bar 10
$\theta_{ww}$: rotational angle of the second shaft 9 (second shaft rotational angle)
The second shaft rotational angle $\theta_{ww}$ is computed based on the following formula (3-1).

$$\theta_{ww}=(\theta_m/r_{wg})+(T_m/k_{gear}) \qquad (3\text{-}1)$$

$\theta_m$: rotational angle of the electric motor 18 (rotor rotational angle detected by the rotational angle sensor 23 in the embodiment)
$T_m$: motor torque estimated value
$k_{gear}$: rigid motor torque estimated value between the worm gear and the worm wheel
$T_m$ can be computed by multiplying the motor current detected by the current detection unit 39 (see FIG. 2) by a torque constant of the electric motor 18, for example.
The second shaft rotational angle $\theta_{ww}$ may also be computed based on the following formula (3-2).

$$\theta_{ww}=\theta_m/r_{wg} \qquad (3\text{-}2)$$

As seen from the formula (3-1), the value of $(T_m/k_{gear})$ is small in the case where $k_{gear}$ is large, but the value of $(T_m/k_{gear})$ is large in the case where $k_{gear}$ is small. Thus, while the second shaft rotational angle $\theta_{ww}$ may be computed based on the formula (3-2) in the case where $k_{gear}$ is large, the second shaft rotational angle $\theta_{ww}$ is preferably computed based on the formula (3-1) in the case where $k_{gear}$ is small. The viscous friction torque estimated value $(-T_c)$ is an estimated value of viscous friction torque that acts on the first shaft 8 and the steering wheel 2. The viscous friction torque is generated by sliding of a bearing that supports the first shaft 8, the spiral cable 33 connected to the steering wheel 2, etc.

The viscous friction torque estimated value $(-T_c)$ is computed based on the following formula (4-1).

$$-T_c=-G_c\cdot d\theta_{sw}/dt \qquad (4\text{-}1)$$

$G_c$: viscous friction torque coefficient
$d\theta_{sw}/dt$: steering wheel angular speed estimated value (a first-order differential value of $\theta_{sw}$)
Thus, the viscous friction torque compensation value $T_c$ is computed based on the following formula (4-2).

$$T_c=G_c\cdot d\theta_{sw}/dt \qquad (4\text{-}2)$$

The viscous friction torque coefficient $G_c$ can be calculated as follows. The torsion bar torque $T_{tb}$ in a steady state is measured using the steering wheel angular speed estimated value $d\theta_{sw}/dt$ as a parameter by driving the electric motor 18 in the hands-free state. The term "steady state" refers to a state in which the steering wheel 2 is not subjected to rotational angular acceleration, that is, a state in which the steering wheel angular acceleration estimated value $d_2\theta_{sw}/dt_2$ is 0. The rate of variation (gradient) in the torsion bar torque $T_{tb}$ with respect to the steering wheel angular speed estimated value $d\theta_{sw}/dt$ is calculated as the viscous friction torque coefficient $G_c$. In this event, in the case where the relationship between the steering wheel angular speed estimated value $d\theta_{sw}/dt$ and the torsion bar torque $T_{tb}$ is not linear, such relationship may be approximated by a desired polynomial.

Figure 4:
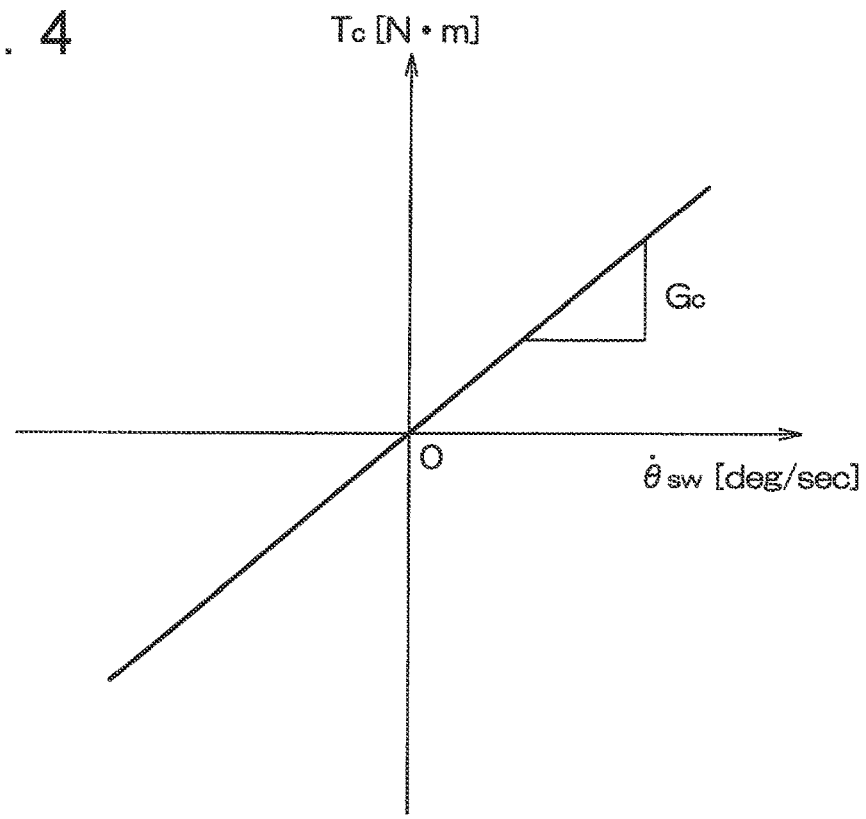
FIG. 4 is a graph illustrating an example of the relationship between a steering wheel angular speed estimated value $d\theta_{sw}/dt$ and a viscous friction torque compensation value $T_c$.
Figure 5A:
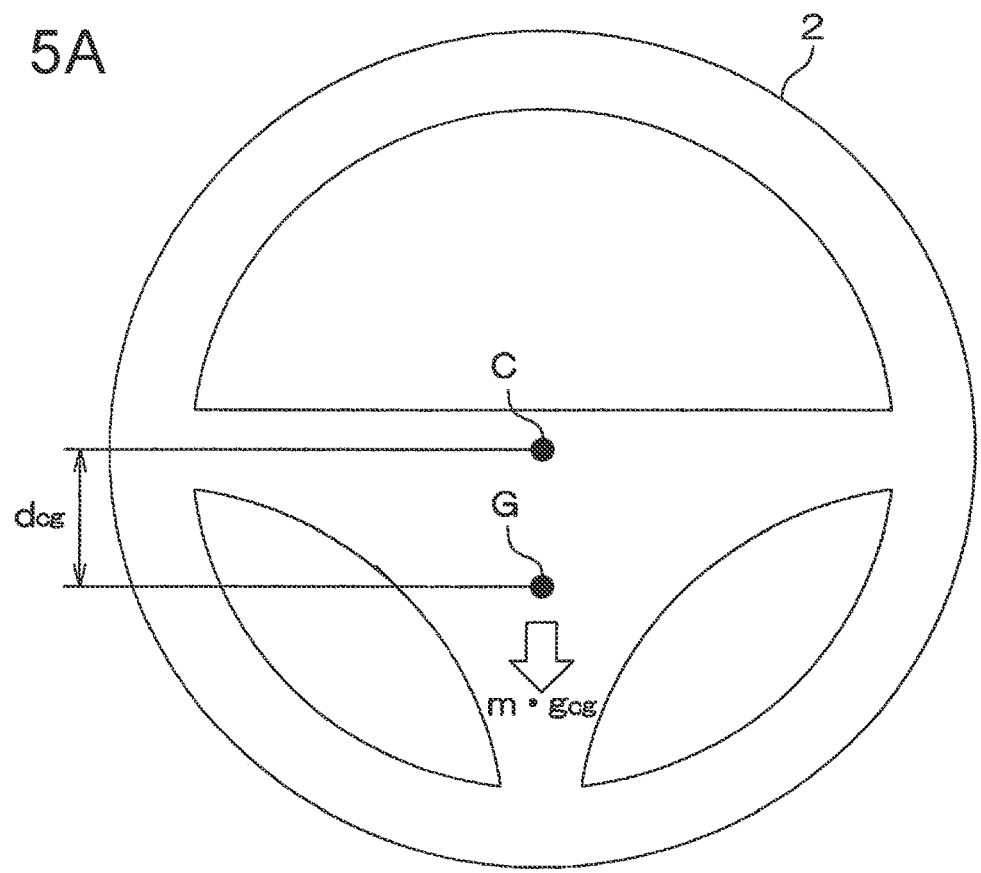
FIG. 5A is a schematic front view illustrating the position of the center of gravity of a steering wheel and the central axis of a first shaft.
Figure 5B:
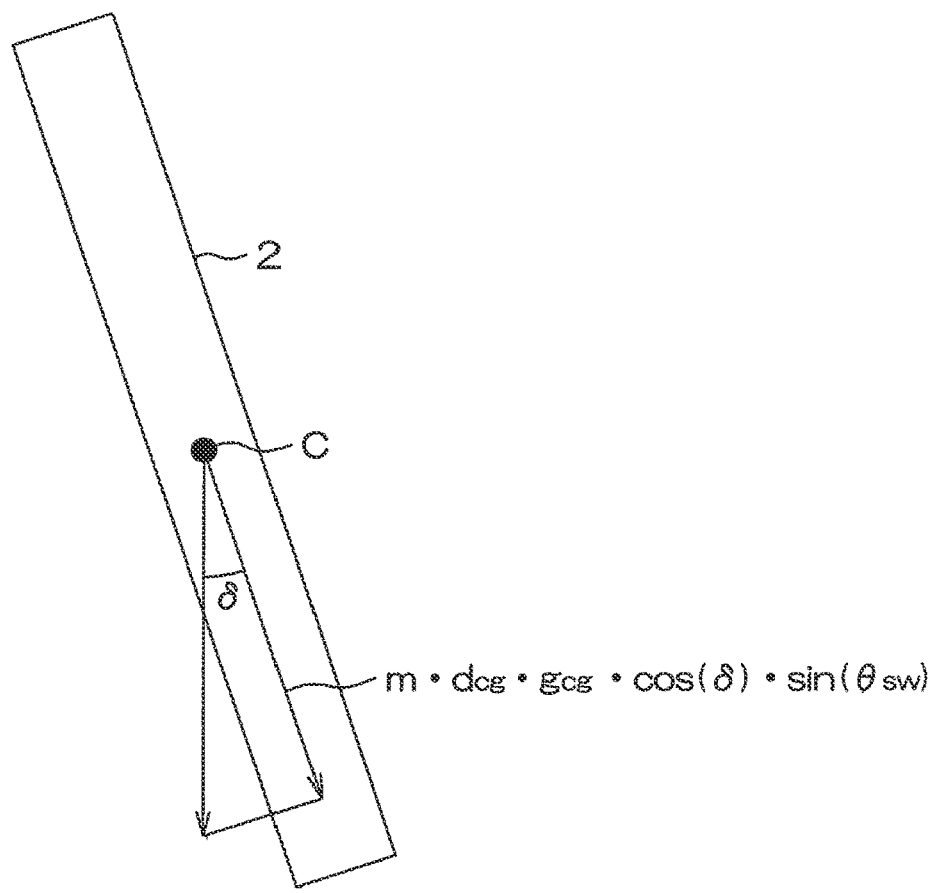
FIG. 5B is a schematic side view of FIG. 5A.

An example of the relationship between the steering wheel angular speed estimated value $d\theta_{sw}/dt$ and the viscous friction torque compensation value $T_c$ is indicated in FIG. 4. The absolute value of the viscous friction torque compensation value $T_c$ becomes larger as the absolute value of the steering wheel angular speed estimated value $d\theta_{sw}/dt$ becomes larger. The rotating unbalance torque estimated value $(-T_{ru})$ will be described. As illustrated in FIG. 5A, a position of a center of gravity G in the plane of rotation of the steering wheel 2 and a center of rotation C (the intersection point between the plane of rotation of the steering wheel 2 and the central axis of the first shaft 8) do not coincide with each other. The distance between the position of the center of gravity G in the plane of rotation of the steering wheel 2 and the position of the center of rotation C is defined as an offset distance $d_{cg}$. The mass of the steering wheel 2 is defined as m, and the gravitational acceleration is defined as $g_{cg}$. Further, as illustrated in FIG. 5B, the angle between a vertical line that passes through the position of the center of rotation C of the steering wheel 2 and the plane of rotation of the steering wheel 2 with the steering wheel 2 mounted on the vehicle is defined as a steering wheel tilt angle $\delta$.

The rotating unbalance torque estimated value $(-T_{ru})$ is an estimated value of torque applied to the first shaft 8 by a gravitational force $m\cdot g_{cg}$ that acts on the center of gravity G of the steering wheel 2. Specifically, the rotating unbalance torque estimated value $(-T_{ru})$ is computed based on the following formula (5-1).

$$-T_{ru}=-G_{gr}\cdot \sin(\theta_{sw}) \qquad (5\text{-}1)$$

$G_{gr}$ is a gravitational force torque coefficient, and is a value that matches the product $m\cdot g_{cg}\cdot d_{cg}\cdot \cos(\delta)$ of the mass m of the steering wheel 2, the gravitational force acceleration $g_{cg}$, the offset distance $d_{cg}$, and the cosine value $\cos(\delta)$ of the steering wheel tilt angle $\delta$. $\sin(\theta_{sw})$ is the sine value of the steering wheel angle estimated value $\theta_{sw}$.

Thus, the rotating unbalance torque compensation value $T_{ru}$ is computed based on the following formula (5-2).

$$T_{ru}=G_{gr}\cdot \sin(\theta_{sw}) \qquad (5\text{-}2)$$

In the case where the offset distance $d_{cg}$, the mass m of the steering wheel 2, and the steering wheel tilt angle $\delta$ are known, the gravitational force torque coefficient $G_{gr}$ can be calculated based on the formula $G_{gr}=m\cdot d_{cg}\cdot g_{cg}\cdot \cos(\delta)$.

Figure 6:
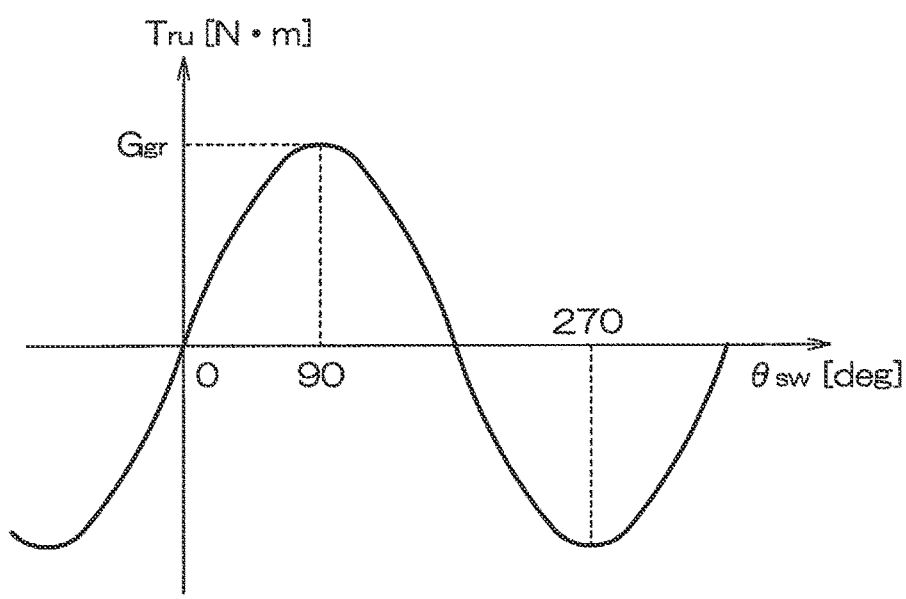
FIG. 6 is a graph illustrating an example of the relationship between a steering wheel angle estimated value $\theta_{sw}$ and a rotating unbalance torque compensation value $T_{ru}$.

The gravitational force torque coefficient $G_{gr}$ can also be calculated as follows. That is, the torsion bar torque $T_{tb}$ in the steady state is measured using the steering wheel angle estimated value $\theta_{sw}$ as a parameter in the hands-free state. The absolute value of the torsion bar torque $T_{tb}$ when the steering wheel angle estimated value $\theta_{sw}$ is 90 degrees is calculated as the gravitational force torque coefficient $G_{gr}$. An example of the relationship between the steering wheel angle estimated value $\theta_{sw}$ and the rotating unbalance torque compensation value $T_{ru}$ is indicated in FIG. 6. Since the gravitational force $m\cdot g_{cg}$ which acts on the center of gravity of the steering wheel 2 is a force in the vertical direction, the absolute value of the rotating unbalance torque compensation value $T_{ru}$ becomes maximum when the steering wheel angle estimated value $\theta_{sw}$ is $\pm 90$ [deg] and $\pm 270$ [deg], and also becomes maximum at angular positions shifted from such positions by every $\pm 180$ [deg]. The Coulomb friction torque estimated value $(-T_{fr})$ is an estimated value of Coulomb friction torque that acts on the first shaft 8 and the steering wheel 2. The Coulomb friction torque is generated by a bearing that supports the first shaft 8, the spiral cable 33 connected to the steering wheel 2, etc.

The Coulomb friction torque estimated value $(-T_{fr})$ is computed based on the following formula (6-1).

$$(-T_{fr}) = -G_f \tanh(\eta \cdot d\theta_{sw}/dt) \tag{6-1}$$

$G_f$: Coulomb friction torque coefficient
η: Coulomb friction torque variation gradient Thus, the Coulomb friction torque compensation value $T_{fr}$ is computed based on the following formula (6-2).

$$T_{fr} = G_f \tanh(\eta \cdot d\theta_{sw}/dt) \tag{6-2}$$

The Coulomb friction torque coefficient $G_{fr}$ can be calculated as follows. The motor torque applied to the second shaft 9 by the electric motor 18 is gradually increased in the hands-free state, and the absolute value of the torsion bar torque $T_{tb}$ at the time when the absolute value of the steering wheel angular speed estimated value $d\theta_{sw}/dt$ becomes more than zero, that is, at the time when the steering wheel 2 starts moving, is calculated as the Coulomb friction torque coefficient $G_f$. The Coulomb friction torque variation gradient η is determined by tuning.

Figure 7:
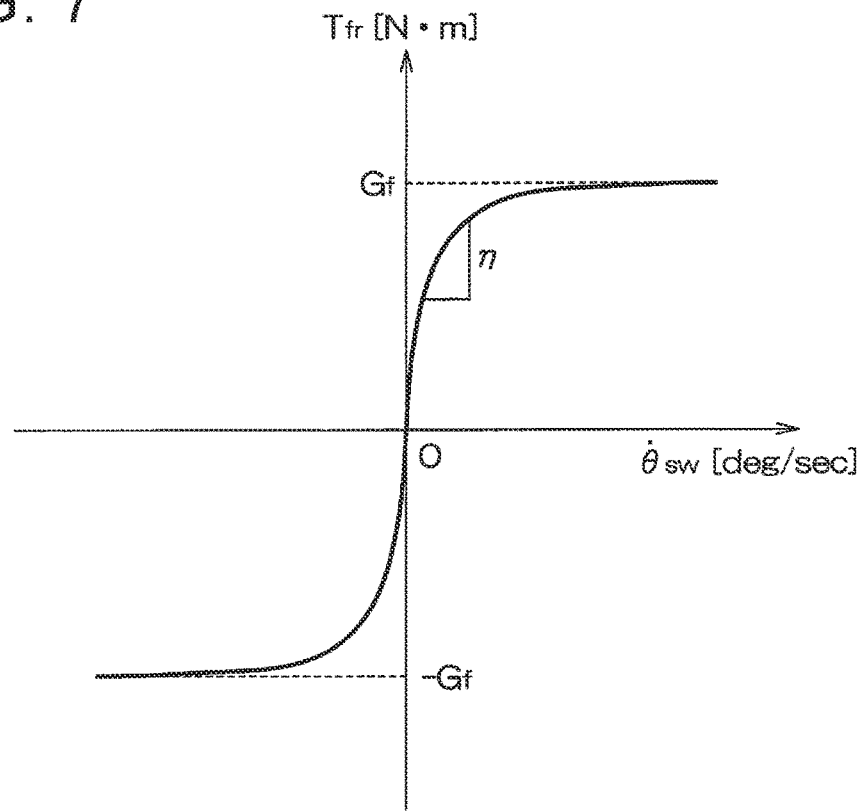
FIG. 7 is a graph illustrating an example of the relationship between the steering wheel angular speed estimated value $d\theta_{sw}/dt$ and a Coulomb friction torque compensation value $T_{fr}$.

An example of the relationship between the steering wheel angular speed estimated value $d\theta_{sw}/dt$ and the Coulomb friction torque compensation value $T_{fr}$ is indicated in FIG. 7. When the absolute value of the steering wheel angular speed estimated value $d\theta_{sw}/dt$ is increased from 0, the absolute value of the Coulomb friction torque compensation value $T_{fr}$ becomes larger at a relatively high variation rate in the range in which the absolute value of the steering wheel angular speed estimated value $d\theta_{sw}/dt$ is small, and thereafter converges to the magnitude of the Coulomb friction torque coefficient $G_f$. The rate of variation in the Coulomb friction torque compensation value $T_{fr}$ with respect to the steering wheel angular speed estimated value $d\theta_{sw}/dt$ in the range in which the absolute value of the steering wheel angular speed estimated value $d\theta_{sw}/dt$ is small becomes higher as the Coulomb friction torque variation gradient η is larger.

Figure 8:
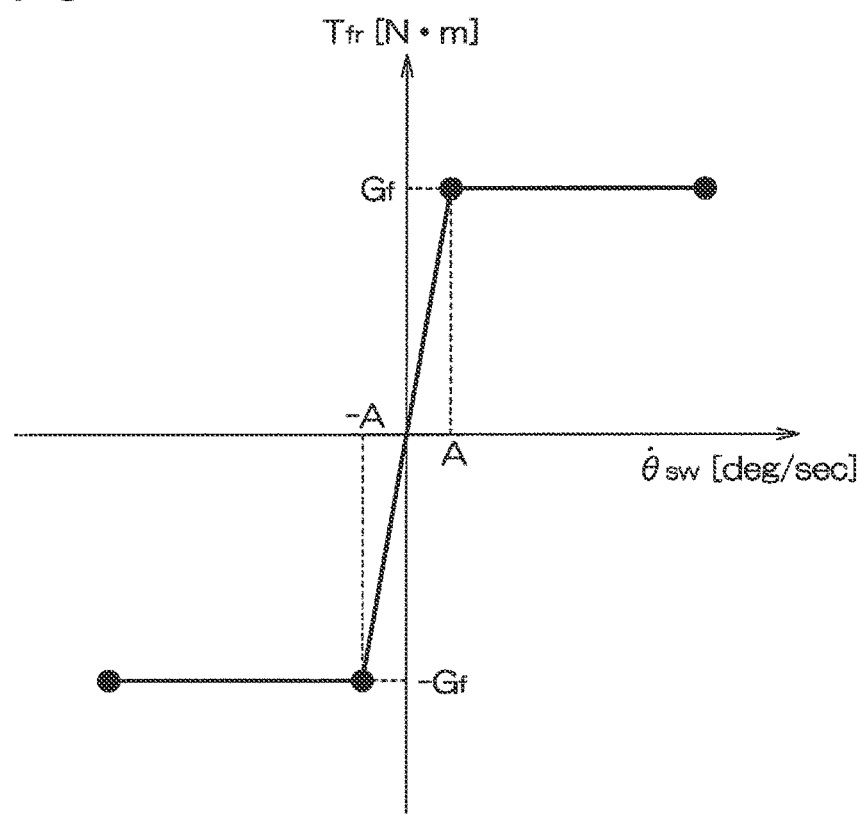
FIG. 8 is a graph illustrating another example of the relationship between the steering wheel angular speed estimated value $d\theta_{sw}/dt$ and the Coulomb friction torque compensation value $T_{fr}$.

A map that represents the relationship between the steering wheel angular speed estimated value $d\theta_{sw}/dt$ and the Coulomb friction torque compensation value $T_{fr}$ may be prepared in advance, and the Coulomb friction torque compensation value $T_{fr}$ may be computed based on the map. In this case, the relationship between the steering wheel angular speed estimated value $d\theta_{sw}/dt$ and the Coulomb friction torque compensation value $T_{fr}$ may be as indicated in FIG. 8. In this example, the Coulomb friction torque compensation value $T_{fr}$ has a value of $-G_f$ in the range in which the steering wheel angular speed estimated value $d\theta_{sw}/dt$ is equal to or less than $-A$. The Coulomb friction torque compensation value $T_{fr}$ has a value of $+G_f$ in the range in which the steering wheel angular speed estimated value $d\theta_{sw}/dt$ is equal to or less than $+A$. In the range in which the steering wheel angular speed estimated value $d\theta_{sw}/dt$ is between $-A$ and $+A$, the Coulomb friction torque compensation value $T_{fr}$ is varied linearly from $-G_f$ to $+G_f$ as the steering wheel angular speed estimated value $d\theta_{sw}/dt$ becomes larger. The spiral cable torque estimated value $(-T_{sc})$ is torque that acts on the steering wheel 2 because of the spring characteristics of the spiral cable 33.

The spiral cable torque estimated value $(-T_{sc})$ is computed based on the following formula (7-1).

$$(-T_{sc}) = -k_{sc} \cdot \theta_{sw} \tag{7-1}$$

$k_{sc}$: spring constant of the spiral cable 33

Thus, the spiral cable torque compensation value $T_{sc}$ is computed based on the following formula (7-2).

$$T_{sc} = k_{sc} \cdot \theta_{sw} \tag{7-2}$$

Figure 9:
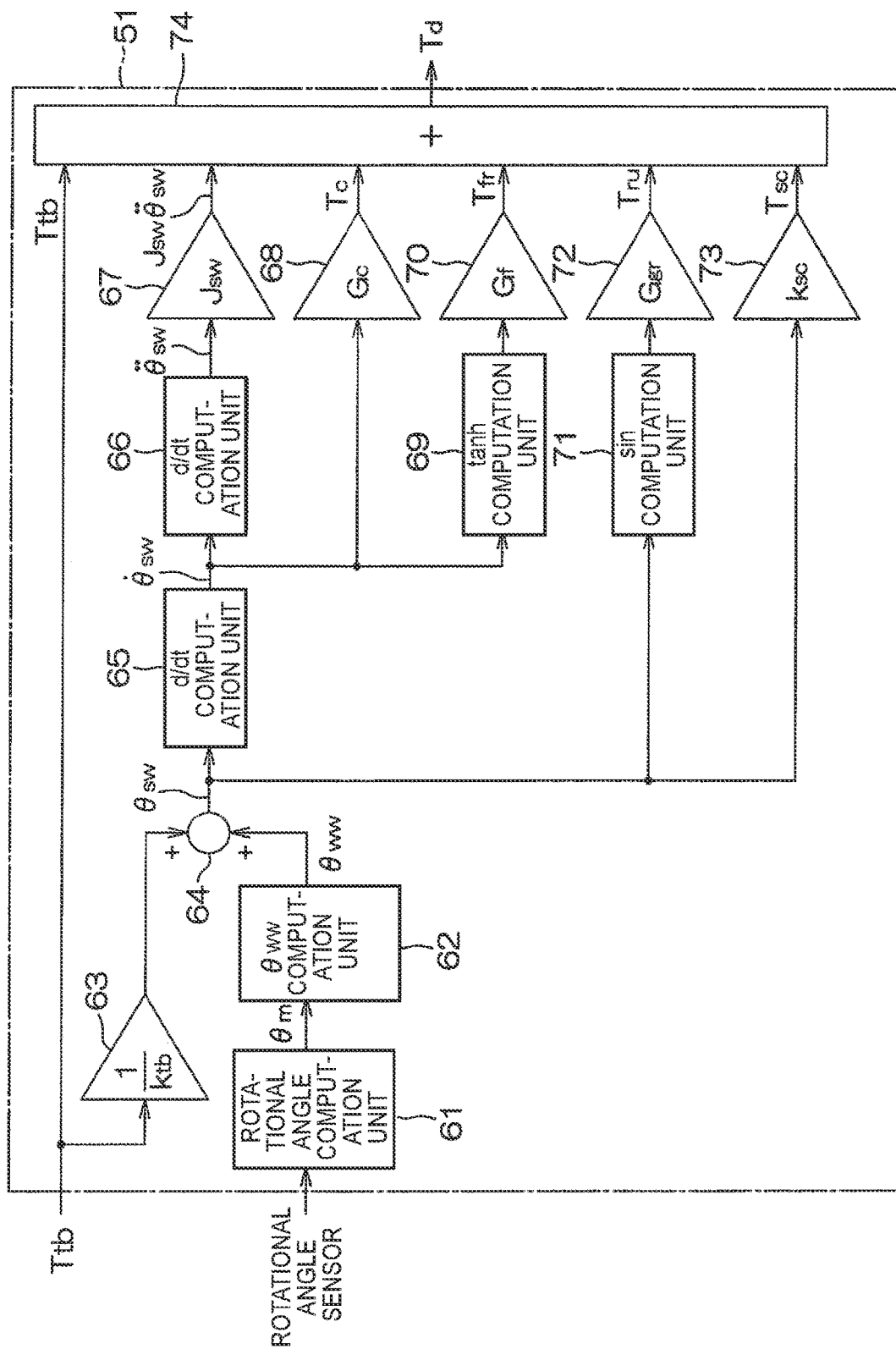
FIG. 9 is a block diagram illustrating the configuration of a driver torque estimation unit.

A map that represents the relationship between the steering wheel angle estimated value $\theta_{sw}$ and the spiral cable torque compensation value $T_{sc}$ may be prepared in advance, and the spiral cable torque compensation value $T_{sc}$ may be computed based on the map. FIG. 9 is a block diagram illustrating the configuration of the driver torque estimation unit 51.

The driver torque estimation unit 51 includes a rotor rotational angle computation unit 61, a second shaft rotational angle computation unit ($\theta_{ww}$ computation unit) 62, a first multiplication unit 63, a first addition unit 64, a first differential computation unit 65, a second differential computation unit 66, and a second multiplication unit 67. The driver torque estimation unit 51 further includes a third multiplication unit 68, a tanh computation unit 69, a fourth multiplication unit 70, a sin computation unit 71, a fifth multiplication unit 72, a sixth multiplication unit 73, and a second addition unit 74.

The rotor rotational angle computation unit 61 computes the rotational angle (rotor rotational angle) $\theta_m$ of the electric motor 18 based on the output signal from the rotational angle sensor 23. The second shaft rotational angle computation unit ($\theta_{ww}$ computation unit) 62 computes the second shaft rotational angle $\theta_{ww}$ based on the formula (3-1). The second shaft rotational angle computation unit ($\theta_{ww}$ computation unit) 62 may compute the second shaft rotational angle $\theta_{ww}$ based on the formula (3-2).

The first multiplication unit 63 multiplies the torsion bar torque $T_{tb}$, which is detected by the torque sensor 11, by the reciprocal of the rigidity $k_{tb}$ of the torsion bar 10. The first addition unit 64 computes the steering wheel angle estimated value $\theta_{sw}$ (see the formula (2)) by adding the second shaft rotational angle $\theta_{ww}$, which is computed by the second shaft rotational angle computation unit 62, to the result $T_{tb}/k_{tb}$ of the multiplication by the first multiplication unit 63.

The first differential computation unit 65 computes the steering wheel angular speed estimated value $d\theta_{sw}/dt$ by differentiating the steering wheel angle estimated value $\theta_{sw}$, which is computed by the first addition unit 64, with respect to time. The second differential computation unit 66 computes the steering wheel angular acceleration estimated value $d_2\theta_{sw}/dt_2$ by differentiating the steering wheel angular speed estimated value $d\theta_{sw}/dt$, which is computed by the first differential computation unit 65, with respect to time.

The second multiplication unit 67 computes the steering wheel inertial torque compensation value $J_{sw} \cdot d_2\theta_{sw}/dt_2$ by multiplying the steering wheel angular acceleration estimated value $d_2\theta_{sw}/dt_2$, which is computed by the second differential computation unit 66, by the steering wheel inertial moment $J_{sw}$. The third multiplication unit 68 computes the viscous friction torque compensation value $T_c$ (see the formula (4-2)) by multiplying the steering wheel angular speed estimated value $d\theta_{sw}/dt$, which is computed by the first differential computation unit 65, by the viscous friction torque coefficient $G_c$.

The tanh computation unit 69 computes $\tanh(\eta \cdot d\theta_{sw}/dt)$ using the steering wheel angular speed estimated value $d\theta_{sw}/dt$, which is computed by the first differential computation unit 65, and the Coulomb friction torque variation gradient η. The fourth multiplication unit 70 computes the Coulomb friction torque compensation value $T_{fr}$ (see the formula (6-2)) by multiplying $\tanh(\eta \cdot d\theta_{sw}/dt)$, which is computed by the tanh computation unit 69, by the Coulomb friction torque coefficient $G_f$.

The sin computation unit 71 computes the sine value $\sin(\theta_{sw})$ of the steering wheel angle estimated value $\theta_{sw}$, which is computed by the first addition unit 64. The fifth multiplication unit 72 computes the rotating unbalance torque compensation value $T_{ru}$ (see the formula (5-2)) by multiplying the sine value $\sin(\theta_{sw})$ of the steering wheel angle estimated value $\theta_{sw}$, which is computed by the sin computation unit 71, by the gravitational force torque coefficient $G_{gr}$.

The sixth multiplication unit 73 computes the spiral cable torque compensation value $T_{sc}$ (see the formula (7-2)) by multiplying the steering wheel angle estimated value $\theta_{sw}$, which is computed by the first addition unit 64, by the spring constant $k_{sc}$ of the spiral cable 33. The second addition unit 74 computes the driver torque (estimated value) $T_d$ by adding $J_{sw} \cdot d_2\theta_{sw}/dt_2$, $T_c$, $T_{fr}$, $T_{ru}$, and $T_{sc}$, which are respectively computed by the second, third, fourth, fifth, and sixth multiplication units 67, 68, 70, 72, and 73, to the torsion bar torque $T_{tb}$, which is detected by the torque sensor 11.

In the embodiment, the driver torque $T_d$ is computed in consideration of not only the steering wheel inertial torque estimated value $(-J_{sw} \cdot d_2\theta_{sw})$ and the torsion bar torque $T_{tb}$ but also the viscous friction torque estimated value $(-T_c)$, the rotating unbalance torque estimated value $(-T_{ru})$, the Coulomb friction torque estimated value $(-T_{fr})$, and the spiral cable torque estimated value $(-T_{sc})$. Thus, the driver torque can be estimated precisely.

Returning to FIG. 3, the low-pass filter 52 attenuates a frequency component of the driver torque $T_d$, which is computed by the driver torque estimation unit 51, that is higher than a predetermined cut-off frequency fc. The cut-off frequency fc is set to a value within the range of 3 [Hz] or more and 7 [Hz] or less, for example. In the embodiment, the low-pass filter 52 is a second-order Butterworth filter. The driver torque $T_d'$ after being subjected to the low-pass filter process by the low-pass filter 52 is provided to the hands-on/off determination unit 53.

Figure 10:
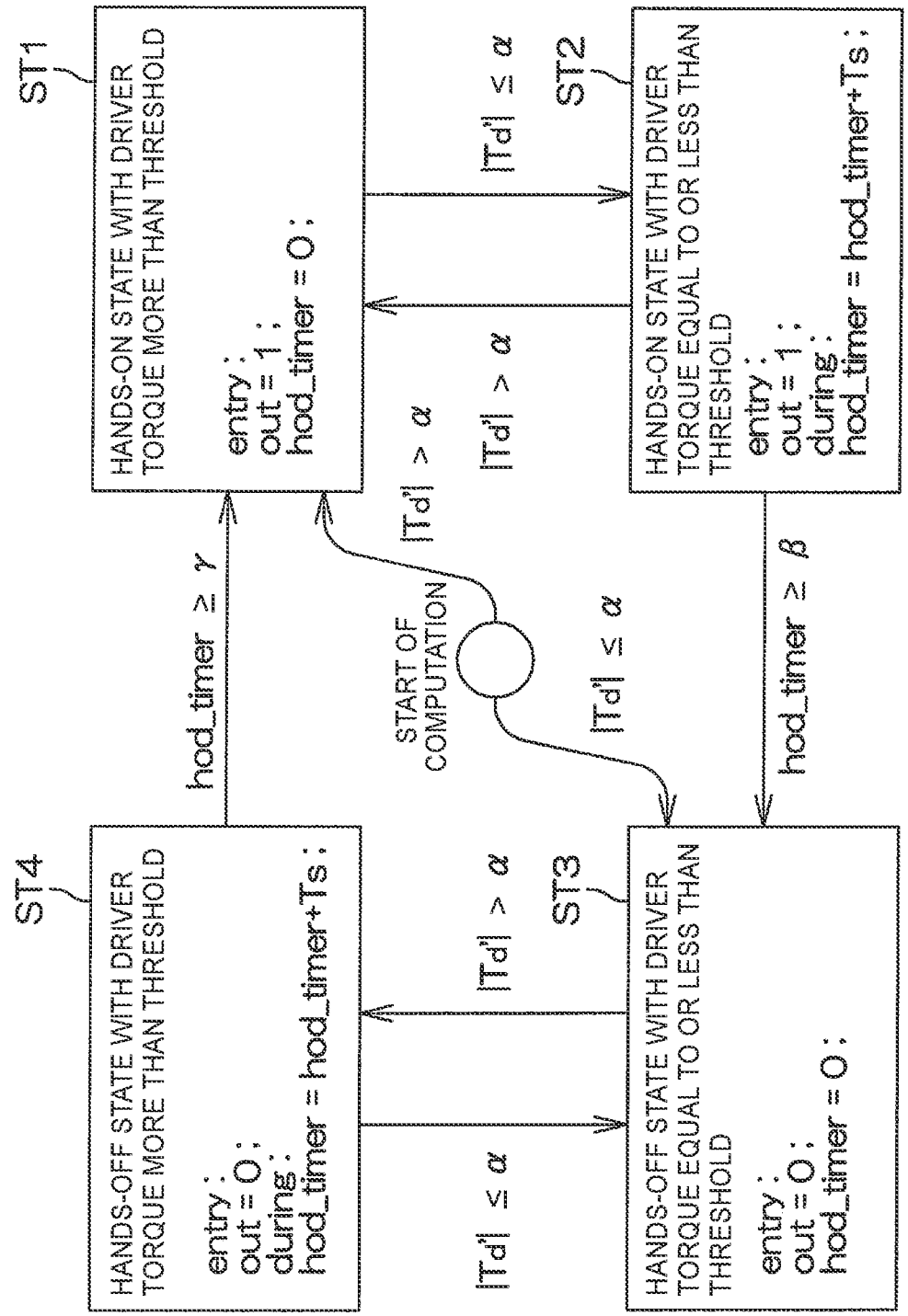
FIG. 10 illustrates state transition for explaining operation of a hands-on/off determination unit.

FIG. 10 illustrates state transition for explaining operation of the hands-on/off determination unit 53. In the description of operation of the hands-on/off determination unit 53, the driver torque $T_d$ after being subjected to the low-pass filter process by the low-pass filter 52 is referred to simply as "driver torque $T_d'$". The hands-on/off determination unit 53 distinguishes four states, namely a "hands-on state (ST1) with the driver torque more than a threshold", a "hands-on state (ST2) with the driver torque equal to or less than the threshold", a "hands-off state (ST3) with the driver torque equal to or less than the threshold", and a "hands-off state (ST4) with the driver torque more than the threshold", as the state of a steering wheel operation performed by the driver. The hands-on/off determination unit 53 distinguishes the four states every predetermined time T [sec].

In the "hands-on state (ST1) with the driver torque more than the threshold", the absolute value of the driver torque $T_d'$ is more than a predetermined threshold $\alpha$ (>0). In the "hands-on state (ST2) with the driver torque equal to or less than the threshold", the absolute value of the driver torque $T_d'$ is equal to or less than the threshold $\alpha$. In the "hands-off state (ST3) with the driver torque equal to or less than the threshold", the absolute value of the driver torque $T_d'$ is equal to or less than the threshold $\alpha$. In the "hands-off state (ST4) with the driver torque more than the threshold", the absolute value of the driver torque $T_d'$ is more than the threshold $\alpha$. The threshold $\alpha$ is set to a value within the range of 0.1 [Nm] or more and 0.3 [Nm] or less, for example.

When it is unknown which of the four states is established and the absolute value of the driver torque $T_d'$ is more than the threshold $\alpha$ at the time of start of determination, the hands-on/off determination unit 53 determines that the steering wheel operation state is the "hands-on state (ST1) with the driver torque more than the threshold". The hands-on/off determination unit 53 sets the output signal (out) to "1", and sets a time counter value hod_timer to 0. The output signal (out) is a signal that represents the determination result. When the output signal (out) is "1", the determination result is hands-on. When the output signal (out) is "0", the determination result is hands-off.

When the absolute value of the driver torque $T_d'$ becomes equal to or less than the threshold $\alpha$ in the "hands-on state (ST1) with the driver torque more than the threshold", the hands-on/off determination unit 53 determines that the steering wheel operation state has become the "hands-on state (ST2) with the driver torque equal to or less than the threshold". The hands-on/off determination unit 53 sets the output signal (out) to "1". In the case where the "hands-on state (ST2) with the driver torque equal to or less than the threshold" is determined, the hands-on/off determination unit 53 updates the time counter value hod_timer to a value obtained by adding a predetermined value Ts to the current value (hod_timer) each time the predetermined time T [sec] elapses.

When the absolute value of the driver torque $T_d'$ becomes more than the threshold $\alpha$ before the time counter value hod_timer reaches a predetermined hands-off determination threshold $\beta$ (>0) in the "hands-on state (ST2) with the driver torque equal to or less than the threshold", the hands-on/off determination unit 53 determines that the steering wheel operation state has become the "hands-on state (ST1) with the driver torque more than the threshold", and sets the time counter value hod_timer to 0.

When the time counter value hod_timer reaches the hands-off determination threshold $\beta$ without the absolute value of the driver torque $T_d'$ becoming more than the threshold $\alpha$ in the "hands-on state (ST2) with the driver torque equal to or less than the threshold", the hands-on/off determination unit 53 determines that the steering wheel operation state has become the "hands-off state (ST3) with the driver torque equal to or less than the threshold". The hands-on/off determination unit 53 sets the output signal (out) to "0", and sets a time counter value hod_timer to 0. The hands-off determination threshold $\beta$ is set to a value within the range of 0.5 [sec] or more and 1.0 [sec] or less, for example.

When the absolute value of the driver torque $T_d'$ becomes more than the threshold $\alpha$ in the "hands-off state (ST3) with the driver torque equal to or less than the threshold", the hands-on/off determination unit 53 determines that the steering wheel operation state has become the "hands-off state (ST4) with the driver torque more than the threshold". The hands-on/off determination unit 53 sets the output signal (out) to "0". In the case where the "hands-off state (ST4) with the driver torque more than the threshold" is determined, the hands-on/off determination unit 53 updates the time counter value hod_timer to a value obtained by adding the predetermined value Ts to the current value (hod_timer) each time the predetermined time T [sec] elapses.

When the absolute value of the driver torque $T_d'$ becomes equal to or less than the threshold $\alpha$ before the time counter value hod_timer reaches a predetermined hands-on determination threshold $\gamma$ (>0) in the "hands-off state (ST4) with the driver torque more than the threshold", the hands-on/off determination unit 53 determines that the steering wheel operation state has become the "hands-off state (ST3) with the driver torque equal to or less than the threshold", and sets the time counter value hod_timer to 0. The hands-on determination threshold γ is set to a value within the range of 0.05 [sec] or more and 0.1 [sec] or less, for example.

When the time counter value hod_timer reaches the hands-on determination threshold γ without the absolute value of the driver torque $T_d'$ becoming equal to or less than the threshold α in the "hands-off state (ST4) with the driver torque more than the threshold", the hands-on/off determination unit 53 determines that the steering wheel operation state has become the "hands-on state (ST1) with the driver torque more than the threshold". The hands-on/off determination unit 53 sets the output signal (out) to "1", and sets a time counter value hod_timer to 0.

When the absolute value of the driver torque $T_d'$ is equal to or less than the threshold α at the time of start of determination, the hands-on/off determination unit 53 determines that the steering wheel operation state is the "hands-off state (ST3) with the driver torque equal to or less than the threshold". The hands-on/off determination unit 53 sets the output signal (out) to "0", and sets a time counter value hod_timer to 0. In the embodiment, the driver torque $T_d$ is estimated precisely by the driver torque estimation unit 51. A high-frequency component of the estimated driver torque $T_d$ is removed. A hands-on/off determination is made using the torque threshold α and the time counter value hod_timer based on the driver torque $T_d'$ after removal of the high-frequency component. Therefore, it is possible to precisely determine whether a hands-on state in which the driver is grasping the steering wheel is established or a hands-off state in which the driver is not grasping the steering wheel is established.

The hands-on/off determination result can be utilized for mode switching control in a vehicle that has an automatic operation mode and a manual operation mode as operation modes, such as switching to the manual operation mode after confirming that the hands-on state has been established when switching is made from the automatic operation mode to the manual operation mode, for example. While an embodiment of the present disclosure has been described above, the present disclosure may be implemented in other embodiments. For example, in the embodiment discussed earlier, the driver torque estimation unit 51 computes the driver torque $T_d$ based on the formula (1). However, the driver torque estimation unit 51 may compute the driver torque $T_d$ based on the following formula (8), (9), (10), or (11).

$$T_d = J_{sw} \cdot d_2\theta_{sw}/dt_2 + T_{tb} - T_{sc} \quad (8)$$

$$T_d = J_{sw} \cdot d_2\theta_{sw}/dt_2 + T_{tb} + T^{ru} + T_{sc} \quad (9)$$

$$T_d = J_{sw} \cdot d_2\theta_{sw}/dt_2 + T_{tb} + T_{ru} + T_{fr} + T_{sc} \quad (10)$$

$$T_d = J_{sw} \cdot d_2\theta_{sw}/dt_2 + T_{tb} + T_c + T_{ru} + T_{sc} \quad (11)$$

In the embodiment discussed earlier, the driver torque $T_d$ is computed using the steering wheel angle estimated value $\theta_{sw}$, which is computed using the torsion bar torque $T_{tb}$ and the second shaft rotational angle $\theta_{ww}$, as the rotational angle of the steering wheel 2. However, the driver torque $T_d$ may be computed using the second shaft rotational angle $\theta_{ww}$ as the steering wheel angle estimated value $\theta_{sw}$.

As indicated by the long dashed double-short dashed line in FIG. 1, a steering angle sensor 25 that detects the rotational angle of the steering wheel 2 may be provided on the first shaft 8, and the driver torque $T_d$ may be computed using the rotational angle of the steering wheel 2, which is detected by the steering angle sensor 25, as the steering wheel rotational angle $\theta_{sw}$. In the embodiment discussed earlier, the low-pass filter 52 in the steering wheel operation state determination unit 42 (see FIG. 3) is provided subsequent to the driver torque estimation unit 51. However, the low-pass filter 52 may be provided prior to the driver torque estimation unit 51. Alternatively, the low-pass filter 52 may be omitted.

In the embodiment discussed earlier, the electric motor 18 is a three-phase brushless motor. However, the electric motor 18 may be a brushed direct-current (DC) motor. In the embodiment discussed earlier, the present disclosure is applied to a column assist-type EPS. However, the present disclosure is also applicable to EPSs other than the column assist-type EPS such as a dual pinion-type EPS and a rack assist-type EPS.

The dual pinion-type EPS has a pinion shaft (first pinion shaft) that has a pinion (hereinafter referred to as a "first pinion") meshed with the rack in FIG. 1 (hereinafter referred to as a "first rack"), a second pinion shaft not coupled to a steering shaft, and a steering assist mechanism provided on the second pinion shaft. The second pinion shaft has a second pinion meshed with a second rack provided on a rack shaft. In this case, the steering assist mechanism is composed of an electric motor and a speed reducer that transfers torque of the electric motor to the second pinion shaft.

In the case of the dual pinion-type EPS, the rotational angle of a portion of a rotary shaft (e.g. the steering shaft 6, the intermediate shaft 7, and the pinion shaft 13 in FIG. 1) that rotates together with a steering wheel downstream of a torsion bar is computed based on the rotational angle of the electric motor, the speed reduction ratio of the speed reducer, the rack gain of a second rack-and-pinion mechanism composed of the second pinion and the second rack, and the rack gain of a first rack-and-pinion mechanism composed of the first pinion and the first rack. The "rack gain" of a rack-and-pinion mechanism is the amount of linear displacement [mm/rev] of a rack per one revolution of a pinion.

Besides, a variety of design changes may be made to the present disclosure without departing from the scope described in the claims.

What is claimed is:
1. A steering device comprising:
   a steering wheel configured to steer a vehicle;
   a torsion bar provided at an intermediate portion of a rotary shaft that rotates together with the steering wheel;
   a spiral cable, a first end of which is connected to a first member that rotates together with the rotary shaft and a second end of which is connected to a second member that is stationary with respect to a vehicle body;
   a torque sensor configured to detect torsion bar torque applied to the torsion bar; and
   an electronic control unit configured to estimate driver torque applied to the steering wheel by a driver,
   the electronic control unit being configured to compute a rotational angle of the steering wheel;
   the electronic control unit being configured to compute, as the driver torque, a value that includes a sum obtained by adding the torsion bar torque, a steering wheel inertial torque compensation value, and a compensation value for spiral cable torque;

the steering wheel inertial torque compensation value being a product of a steering wheel inertial moment and a second-order differential value of the rotational angle of the steering wheel; and the spiral cable torque being torque that acts on the steering wheel because of the spiral cable.

2. The steering device according to claim 1, further comprising:

a steering mechanism that steers steered wheels in conjunction with rotation of the steering wheel; and an electric motor that applies a steering assist force to the steering mechanism, wherein:

the electronic control unit is configured to compute a rotational angle of a downstream portion of the rotary shaft, the downstream portion being a portion of the rotary shaft located downstream of the torsion bar, based on a rotational angle of the electric motor; and the electronic control unit is configured to compute the rotational angle of the steering wheel using the rotational angle of the downstream portion of the rotary shaft and the torsion bar torque.

3. The steering device according to claim 1, further comprising a rotational angle sensor configured to detect the rotational angle of the steering wheel, wherein the electronic control unit is configured to compute the rotational angle of the steering wheel based on the rotational angle detected by the rotational angle sensor.

4. The steering device according to claim 1, wherein:

the electronic control unit is configured to compute the driver torque by adding a compensation value for rotating unbalance torque to the sum; and the rotating unbalance torque is torque applied to the rotary shaft by a gravitational force that acts on a center of gravity of the steering wheel.

5. The steering device according to claim 1, wherein:

the electronic control unit is configured to compute the driver torque by adding a compensation value for viscous friction torque to the sum;

the viscous friction torque acts on an upstream portion of the rotary shaft and the steering wheel, the upstream portion being a portion of the rotary shaft located upstream of the torsion bar; and the compensation value for the viscous friction torque is a product of a first-order differential value of the rotational angle of the steering wheel and a predetermined viscous friction torque coefficient.

6. The steering device according to claim 1, wherein:

the electronic control unit is configured to compute the driver torque by adding a compensation value for coulomb friction torque to the sum;

the coulomb friction torque acts on an upstream portion of the rotary shaft and the steering wheel, the upstream portion being a portion of the rotary shaft located upstream of the torsion bar; and the compensation value for the coulomb friction torque is a product of a predetermined coulomb friction torque coefficient and a hyperbolic tangent value of a product of a predetermined coulomb friction torque variation gradient and a first-order differential value of the rotational angle of the steering wheel.

7. The steering device according to claim 1, wherein the compensation value for the spiral cable torque is obtained from a product of a spring constant of the spiral cable and the rotational angle of the steering wheel or from map data that represent the compensation value for the spiral cable torque relative to the rotational angle of the steering wheel.

8. The steering device according to claim 4, wherein:

the compensation value for the rotating unbalance torque is a product of a distance between a position of the center of gravity of the steering wheel and a position of a center of rotation of the steering wheel, a mass of the steering wheel, a sine value of the rotational angle of the steering wheel, and a cosine value of a steering wheel tilt angle;

the steering wheel tilt angle is an angle between a vertical line that passes through the position of the center of rotation of the steering wheel and a plane of rotation of the steering wheel with the steering wheel mounted on the vehicle; and the rotational angle of the steering wheel is an angle that matches an amount of rotation and a direction of rotation from a neutral position of the steering wheel at which the vehicle travels straight forward.

9. The steering device according to claim 1, wherein the electronic control unit is configured to determine, based on the estimated driver torque, whether a hands-on state is established or a hands-off state is established.

* * * * *